No. 658,791. Patented Oct. 2, 1900.
R. LESCH & B. POLTE.
MACHINE FOR MANUFACTURING TILES.
(Application filed Feb. 25, 1898.)

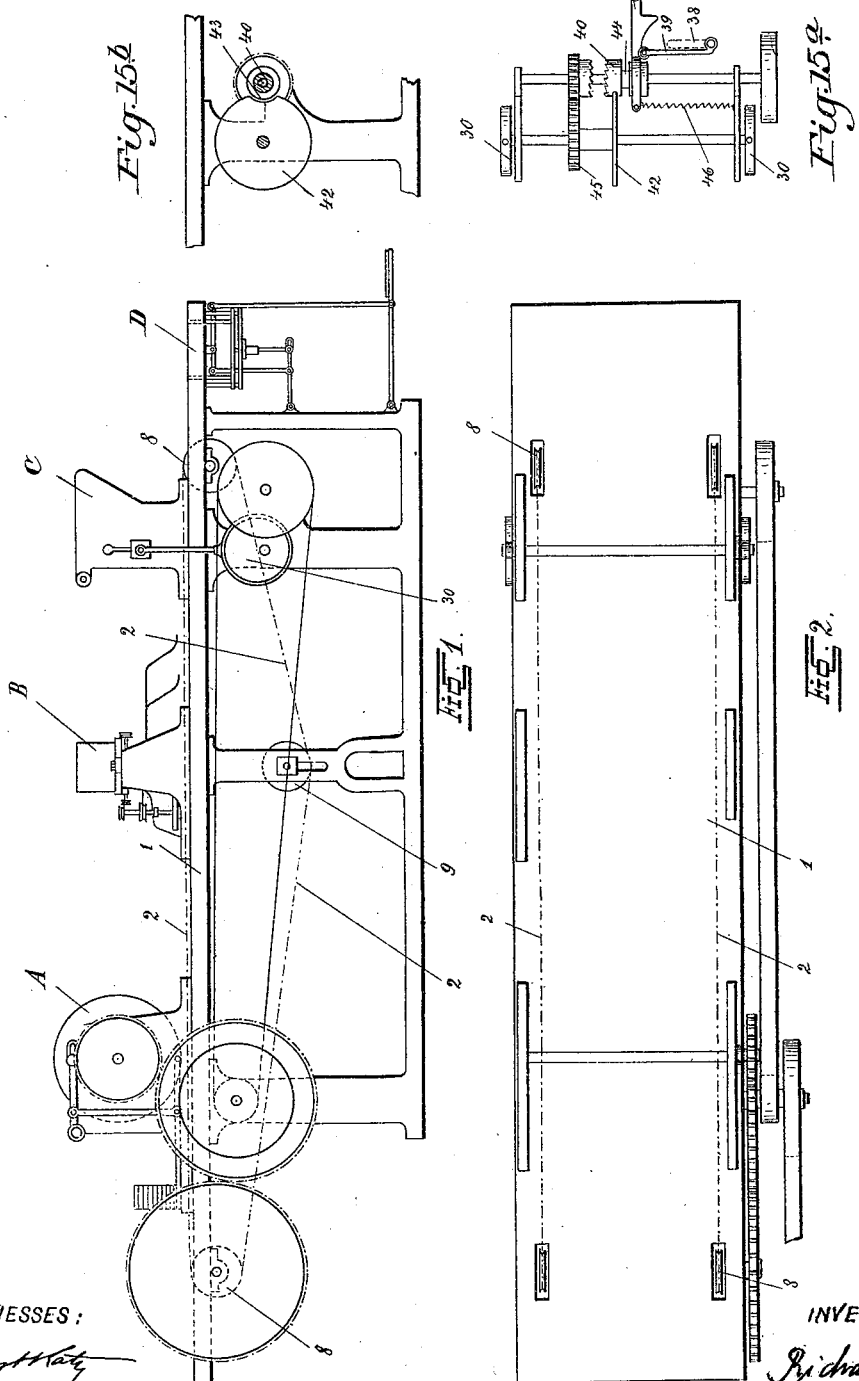

(No Model.) 5 Sheets—Sheet 2.

WITNESSES:
INVENTORS:

No. 658,791. Patented Oct. 2, 1900.
R. LESCH & B. POLTE.
MACHINE FOR MANUFACTURING TILES.
(Application filed Feb. 25, 1898.)
(No Model.) 5 Sheets—Sheet 3.
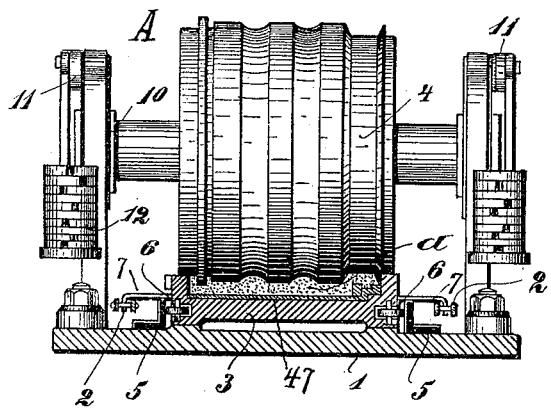
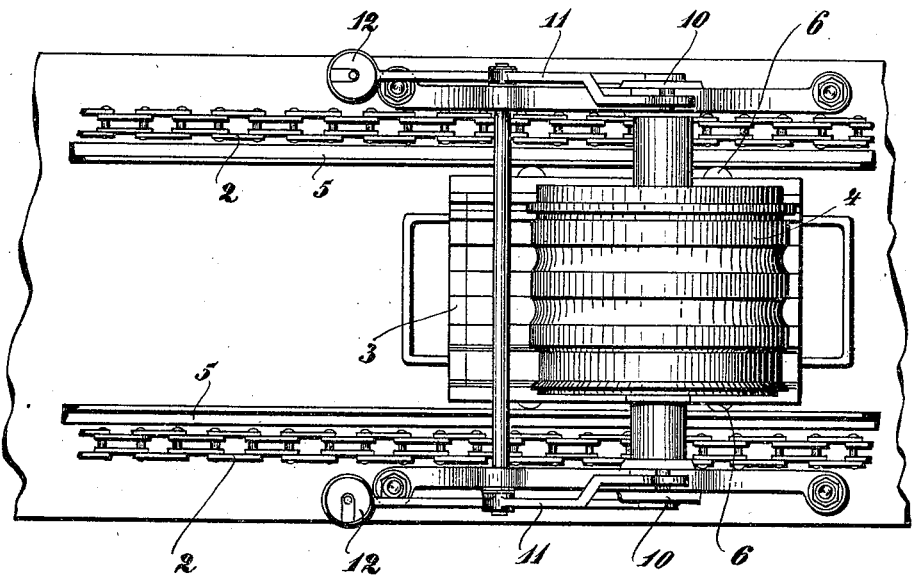
WITNESSES:
INVENTORS
Richard Lesch
Bruno Polte
BY
ATTORNEYS.

No. 658,791. Patented Oct. 2, 1900.
R. LESCH & B. POLTE.
MACHINE FOR MANUFACTURING TILES.
(Application filed Feb. 25, 1898.)
(No Model.) 5 Sheets—Sheet 4.
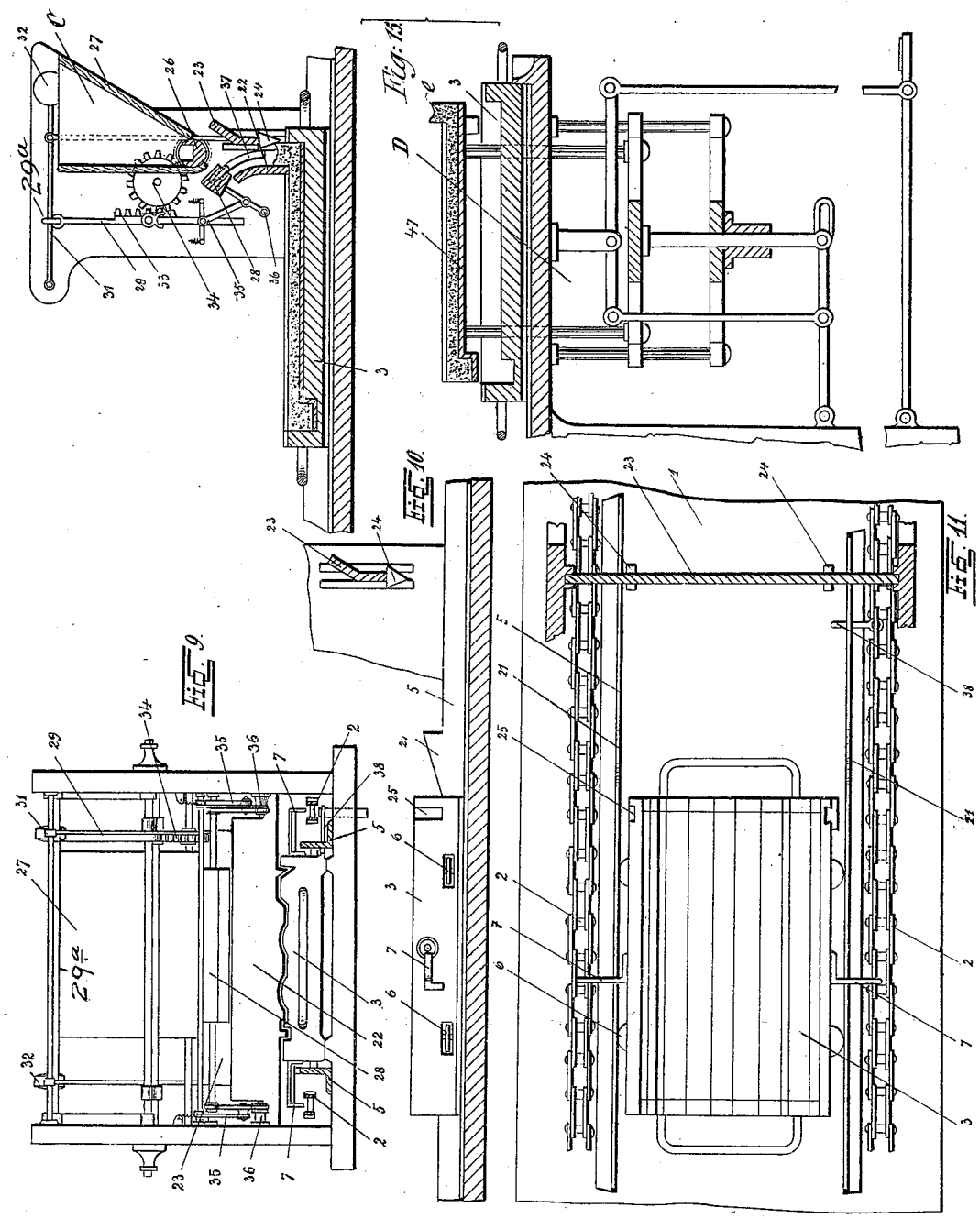
WITNESSES:
Geo. W. Jaekel
E. Gast
INVENTORS
Richard Lesch
Bruno Polte
by Joshua Raegener
Attorneys No. 658,791. Patented Oct. 2, 1900.
R. LESCH & B. POLTE.
MACHINE FOR MANUFACTURING TILES.
(Application filed Feb. 25, 1898.)
(No Model.) 5 Sheets—Sheet 5.

WITNESSES: INVENTORS:
Richard Lesch
Bruno Polte

UNITED STATES PATENT OFFICE.

RICHARD LESCH AND BRUNO POLTE, OF KONSTADT, GERMANY.

MACHINE FOR MANUFACTURING TILES.

SPECIFICATION forming part of Letters Patent No. 658,791, dated October 2, 1900.

Application filed February 25, 1898. Serial No. 671,682. (No model.)

*To all whom it may concern:*

Be it known that we, RICHARD LESCH and BRUNO POLTE, manufacturers, of Konstadt, Province of Silesia, in the German Empire, have invented some new and useful Improvements in Machines for Manufacturing Tiles and the Like, of which the following is a full and clear description.

This invention relates to a machine for manufacturing tiles and the like; and its object is to construct the machine in such a manner that only the filling and emptying of the mold have to be performed by hand, all the other operations being automatically performed by the machine itself.

It will of course be understood that the invention is applicable to the formation of all classes of tiles and similar articles; but it will only be described as applied to a machine for manufacturing cement tiles which may advantageously be used for roofing purposes.

The improved machine consists of four principal parts—viz., a part for pressing or forming the tile, a part for coloring and smoothing it, a part for putting on the "head-rail," and means for emptying the mold.

In order that our invention may be more readily understood, we have hereto appended four sheets of drawings, to which we will hereinafter make reference.

Figure 7:
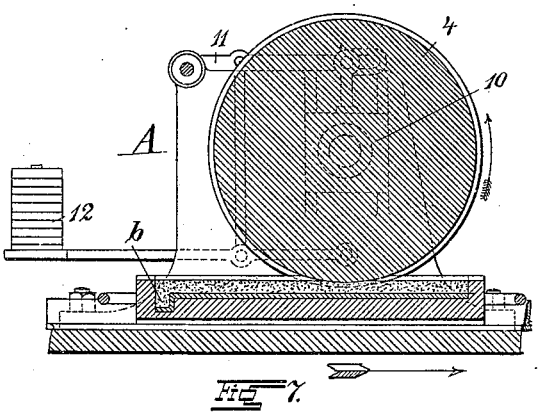
Figure 3:
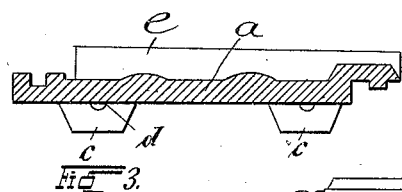
Figure 4:
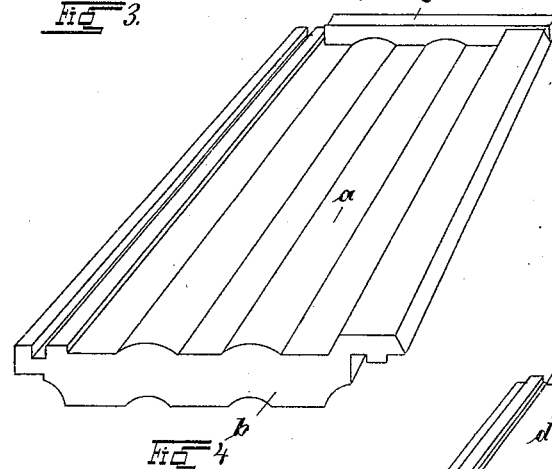
Figure 5:
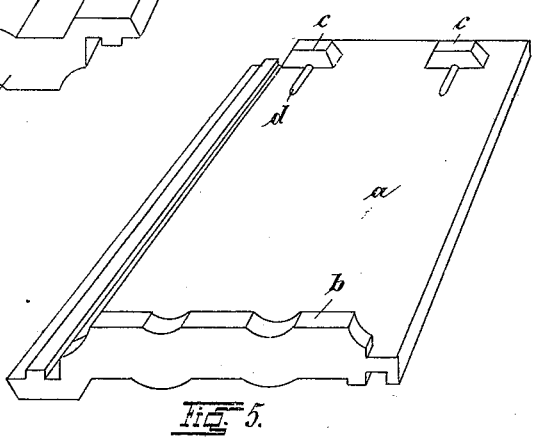
Figure 12:
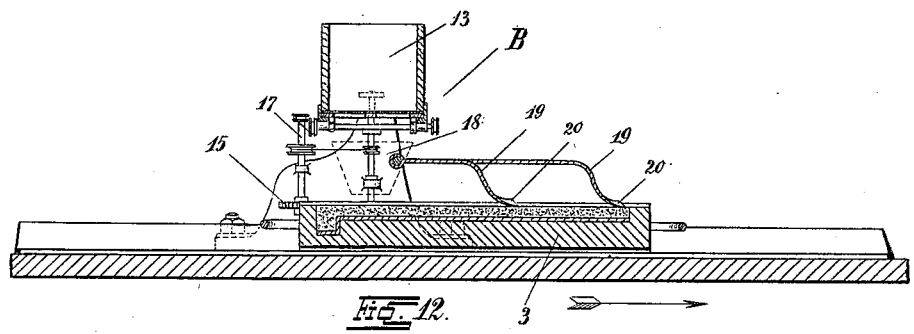
Figure 13:
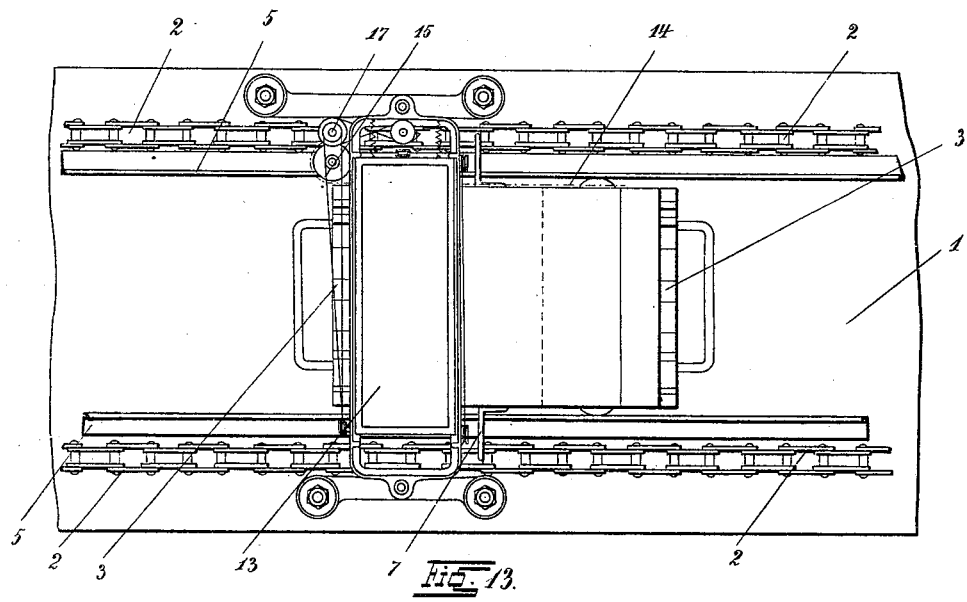
Figure 14:
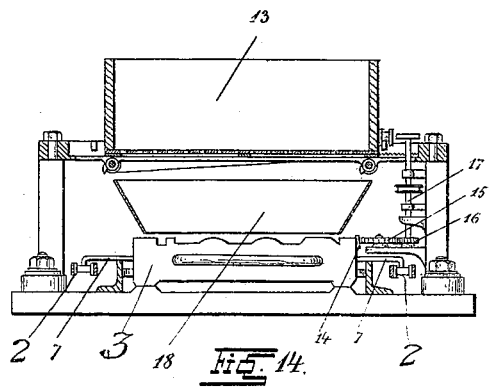

Figure 1 illustrates the machine generally in side elevation. Fig. 2 is a plan view of the frame of the machine and some of the working parts. Figs. 3, 4, and 5 are respectively sectional, perspective top, and perspective bottom views of a tile made by the present invention. Figs. 6 and 7 are sectional front and side views, respectively, of the mold and the forming and pressing roller. Fig. 8 is a plan view of the same parts, showing also the carrying-chains. Fig. 9 is a front elevation of the mechanism for forming the head-rail on the tile. Fig. 10 is a sectional detail of parts thereof. Fig. 11 is a sectional plan of the same parts. Figs. 12, 13, and 14 are respectively a longitudinal section, a plan view, and a transverse section of the smoothing and coloring device. Fig. 15 is a longitudinal section of the mechanism for forming the head-rail and the mechanism for lifting the mold, parts being in elevation; and Figs. 15ª and 15ᵇ are details of some of the driving parts of the machine.

The machine is provided with a table or stand 1, upon which all the different elements are arranged. The mold 3 is upon the left-hand end of the table and is filled with cement. It is then pushed by the operator a little to the right until it reaches and engages with carrying-chains, by means of which it is drawn through the machine and subjected to the various processes. The mold is released from the chains when it has reached the device for forming the head-rail and may then be withdrawn for emptying by the operator.

The tile $a$ (illustrated by Figs. 3, 4, and 5) is formed on its under side with the projecting rib $b$, two angular projections $c$, and two semicircular projections $d$, and the mold 3, as shown by Figs. 6 and 7, corresponds. The upper side of the tile is provided with a head-rail $e$. Rails 5 are secured to the top of the table 1 to guide the mold, which is provided with lateral rollers 6 during its passage through the machine. The carrying-chains 2 pass along the top of the table outside the rails 5, and the mold is connected to them by means of the movable hooks 7, (see Figs. 9 and 11,) attached or hinged to the mold and adapted to be pressed down to engage with the chains. Chain wheels or rollers 8 guide the chains over the top of the table and adjustable wheels or rollers 9 are provided under the table. The filled mold, being attached to the chains, is first of all drawn to the pressing device A. The essential part of this device consists of a roller 4, the surface of which is formed to correspond with the surface which has to be given to the tile under process of manufacture, as represented in Figs. 6, 7, and 8. This roller is so rotated that its surface speed is greater than the speed at which the mold travels, and it is preferably mounted in vertically-moving bearings 10, to which a system of levers 11 and counterweights 12 are connected. By this arrangement a constant pressure is exerted and the roller is free to lift if it encounters any obstacle, and thus obviates the risk of damage to itself or to the mold. The pressure exerted by the roller may of course be regulated by adjusting the counterweights 12, and to enable this to be easily effected the levers 11 are extended, so as to be within easy reach of the operator who is filling the molds. The end of the mold may be sloped or beveled, so that it engages with and leaves the roller without shock. The mold is drawn under the roller by the chains 2 and the contained cement or the like is subjected to vertical pressure under and is formed by the roller. At the same time the cement is compressed in a horizontal direction, owing to the roller traveling at a greater speed than the mold, and thus tending to push the cement to the back of the mold. A smooth tile of great and equal density is thus obtained. It is preferred to give the roller 4 a surface speed which is approximately six times the speed at which the mold travels. After leaving the roller 4 the mold and the formed tile are drawn by the chains into and through the smoothing and coloring device B, which is illustrated by Figs. 12, 13, and 14. A box or receptacle 13, having a perforated bottom, is arranged to be oscillated or vibrated upon the passage of the mold through the device and contains a powdered dry mixture of the desired color and cement. The side of the mold 3 is formed or provided with a rack 14, which during the passage of the mold engages with a wheel 15, which in turn is in gear with a wheel 16, mounted on the shaft 17. This shaft is connected with another shaft or with other shafts, which upon rotation can, by suitable means evident to skilled mechanics, communicate oscillatory or vibratory motion to the box 13. The passage of the mold thus causes the box to shed some of the contained color upon the tile. In order to insure that the color falls only upon the tile and not over the table, it is preferred to arrange a hopper or funnel 18 under the box. The moisture contained in the tile makes the color damp. The smoothing of the color is effected by causing the tile to pass under suitably-shaped elastic or spring-controlled knives or wipers 19 and 20. The tile is now drawn to the device indicated at C, (see Fig. 15,) by means of which the head-rail is formed and affixed at the point marked e in Fig. 4. To effect this, the mold must come to rest. The disengagement of the mold from the chains 2 is caused by the inclined planes or projections 21, formed on the rails 5 and illustrated in Figs. 10 and 11. The movable hooks upon the mold come into contact with these projections and are lifted thereby out of the links with which they had been previously engaged. Owing to stretching of the chain or other causes the mold may not always stop in its exact position; but it always stops with its leading edge in front of the rail 22, which extends across the mold. The rail 23 is then pressed down, and its tapered or coned edge 24 engages with the grooves or recesses 25 in the mold and draws this latter to its proper and exact position. The two bars 22 and 23 form a space for the reception of the head-rail and guide it to its proper place on the front edge of the tile.

The head-rail is formed by the grooved roller 26, which is placed at the bottom of a hopper containing the plastic material or cement. The groove in the roller is of a capacity sufficient to contain the required mass of material, and when the roller is rotated or partially rotated this amount of material is removed from the hopper and the contents of the groove drop into the space between the bars 22 and 23, which, as shown, are preferably flared outward at their upper ends. Pivoted to the side of the framing at 36 is a ram or punch 28, which is capable of passing between the bars 22 and 23 and pressing the head-rail into place upon the tile, at the same time giving any desired shape to the upper edge of the rail. 37 is a guide-groove for the ram. The operation of these devices is as follows: The rod 29, Fig. 15, is reciprocated vertically by the eccentric 30. (Shown in Figs. 1 and 15ª.) The upper end of the rod 29 is by means of a cross-rod 29ª connected to an arm or lever 31, carrying a counterweight 32 and connected to the bar 23, which thus follows the upward and downward movement of the rod 29. This rod is also formed or provided with a rack 33 to engage with the wheel 34, which is geared with a wheel secured to the shaft of the roller 26. The arrangement is such that during each upward or downward motion of the rod 29 the roller 26 is rotated through an angle of one hundred and eighty degrees. The lower part of the rod is connected by a link with the arm carrying the ram 28, which thus also participates in the motion of the rod. This head-rail-forming mechanism is so disposed and arranged that it is put into operation when the mold comes to rest and put out of operation when the head-rail is formed.

Pivoted upon the table 1 and illustrated in Figs. 11 and 15ª is an arm 38, which is partially rotated by the passage of the mold, inasmuch as the mold strikes it and shifts it to one side. Attached to the arm 38, but beneath the table, is a second arm 39, which also moves through a certain angular distance and the end of which is adapted to come against an inclined projection upon the lever 41. The end of this lever is connected to half of a coupling 40 in such a manner that the movement of the arm 39 causes the clutch to be put in gear, and thus to start the head-rail mechanism. (See Fig. 15ª.) Secured to the shaft of the eccentric 30 and driven from the clutch-wheel by the wheel 45 is a disk 42, part of which is recessed to fit upon the clutch-body 40, as represented in Fig. 15ª. When the clutch is moved longitudinally to put the mechanism into motion, the groove 44 comes opposite to the disk 42 and permits rotation. The disk then rotates within the groove and holds the clutch in its place until a complete revolution has been effected, when the recessed part 43 again comes against the clutch-body and permits its longitudinal withdrawal by the spring 46 and the consequent stoppage of the mechanism. During the time that the clutch was in engagement the head-rail has been formed and attached to the tile. The operator now seizes the mold by a suitably-formed handle and withdraws it from the device C to the device D. This latter, which is for removing the tile from the mold, consists of an arrangement of levers, preferably operated by a treadle, by means of which pokers or the like are caused to pass through suitable perforations in the bottom of the mold. The mold is furnished with a sheet-metal lining 47, which is lifted with the formed tile and which contains the tile during drying, burning, or other subsequent treatment.

Having now particularly described and ascertained the nature of our said invention, we declare that what we claim is—

1. In a machine for manufacturing tiles, the combination of a stationary table, a mold, means for moving the filled mold along and over said table, means for forming, pressing and smoothing the material in the mold, a screen for sifting powdered color onto the pressed material in the mold, means for operating said screen from the mold, and means for forming the head-rail on the tile, substantially as set forth.

2. In a machine for manufacturing tiles, the combination of a stationary table, a mold, means for moving the filled mold along and over the table, a profiled roller for forming, pressing and smoothing the material in the mold, means for turning said roller, a screen for sifting powdered color onto the pressed material in the mold, means for operating the screen from the mold, and means for forming the head-rail on the tile, substantially as set forth.

3. In a machine for manufacturing tiles, the combination of a table, a mold, means for moving the filled mold along said table, a profiled roller, and means for turning said roller at a rate of speed greater than the speed of the mold along the table, whereby the material in the mold is formed, smoothed, and pressed toward one end of the mold, substantially as set forth.

4. In a machine for manufacturing tiles, the combination of a table, a mold, means for fashioning the tile proper in the mold, and means for forming the head-rail on the tile, the said means comprising a stationary forming-rail, a movable forming-rail provided with a tapering edge, adapted to act on the mold to bring it in proper position, means for supplying plastic material between said forming-rails, and means for compressing the said plastic material, substantially as set forth.

In testimony that we claim the foregoing as our invention we have signed our names in presence of two subscribing witnesses.

RICHARD LESCH.
BRUNO POLTE.

Witnesses:
ERNST KATZ,
EDWIN WEISS.